UNITED STATES PATENT OFFICE.

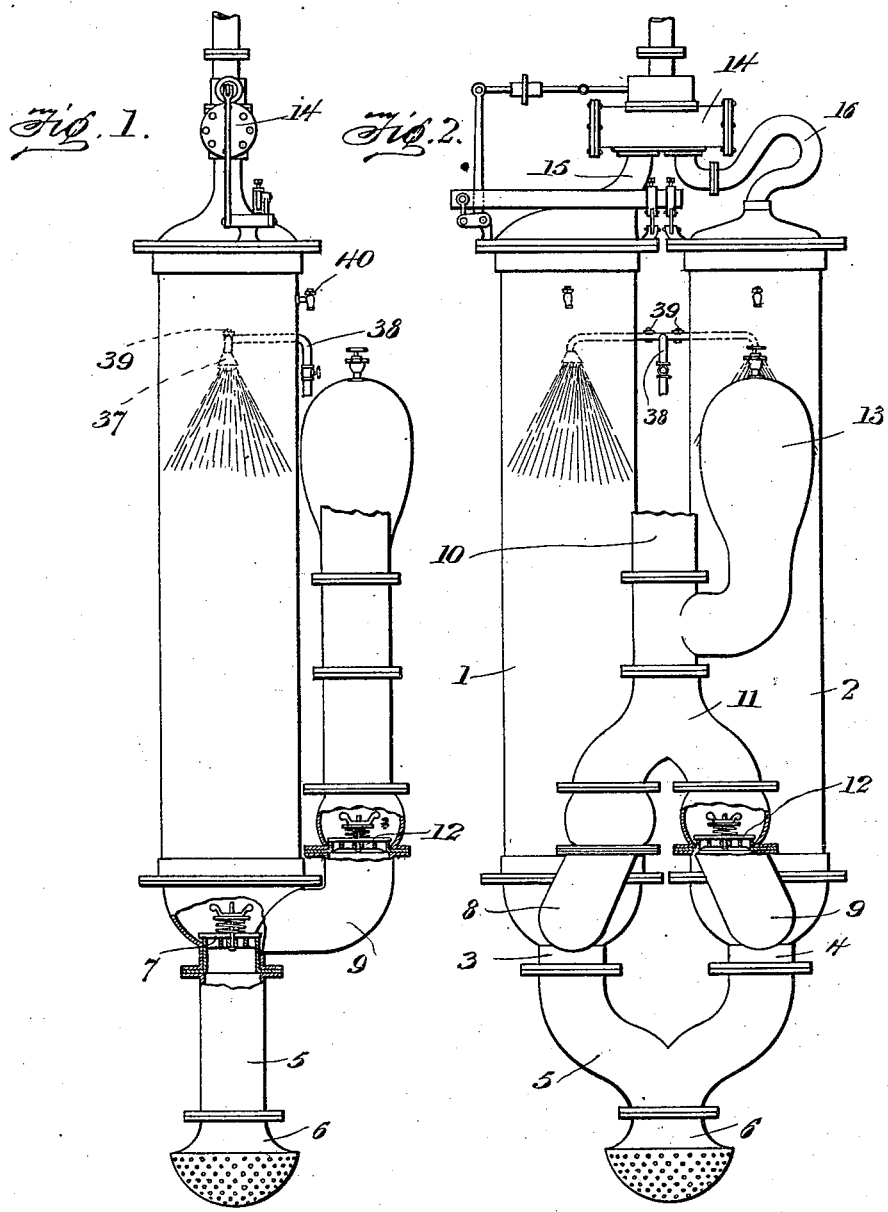

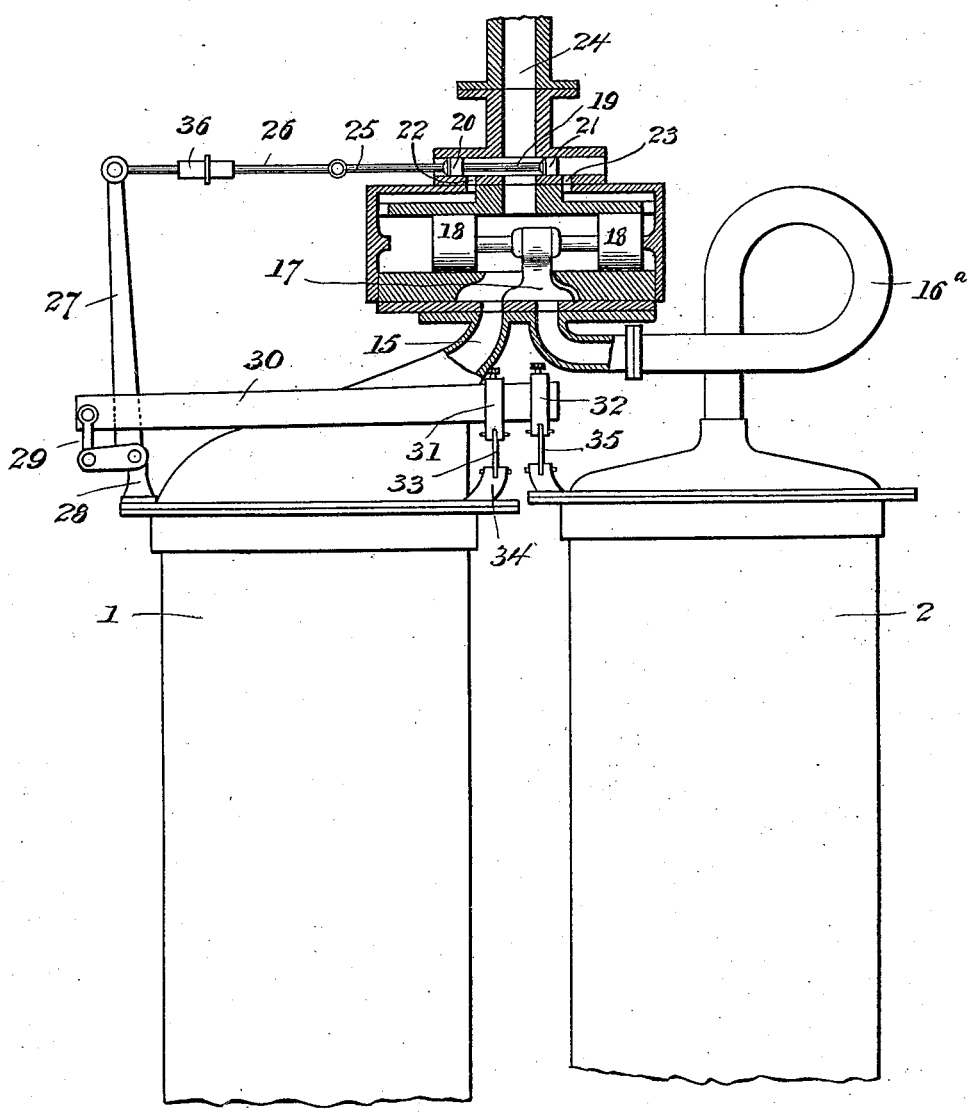

FELIX FREYHOLD, OF WASHINGTON, DISTRICT OF COLUMBIA.

STEAM-PUMP.

SPECIFICATION forming part of Letters Patent No. 693,126, dated February 11, 1902.

Application filed September 21, 1901. Serial No. 76,028. (No model.)

*To all whom it may concern:*

Be it known that I, FELIX FREYHOLD, a citizen of the United States, residing at Washington, in the District of Columbia, have invented certain new and useful Improvements in Steam-Pumps, of which the following is a specification.

This invention comprises certain improvements in steam-pumps of the class in which steam is admitted directly to the pump-cylinders for the purpose of forcing the water into the discharge-pipe and water is drawn into the cylinders under atmospheric pressure by reason of the vacuum created by the subsequent condensation of the steam, the steam-valves being operated by the expansion and contraction of the cylinders.

In the present invention a pair of cylinders are employed, and the steam-valve is operated by the combined movement of said cylinders acting through a lever which is connected to both cylinders.

In the accompanying drawings, Figure 1 is a side elevation of the pump, the water-valves being shown in section. Fig. 2 is a front elevation of the same; and Fig. 3 is an enlarged detail view showing the steam-valve casing in section, the valve-operating levers, and the upper portions of the cylinders.

Referring to the drawings, 1 and 2 indicate a pair of similarly-formed metal cylinders arranged parallel with one another and having inlet-pipes 3 and 4 at their lower ends. As shown, a suction-pipe 5, in the form of a Y, is connected to each of the inlet pipes or openings 3 and 4, and a suitable strainer 6 is connected to the lower end of the suction-pipe. Within each of the inlet-openings a check-valve 7 is arranged, through which water may pass into the cylinders, but which valves prevent the return of the water to the suction-pipe. Outlet-pipes 8 and 9 are also connected to the lower ends of the cylinders, and these pipes are, as shown, connected to a common discharge-pipe 10 by a suitable Y 11. A check-valve 12 is arranged in each of the outlet pipes 8 and 9, said valves being arranged to permit the water to pass into the discharge-pipe and to prevent its return to the cylinders. The usual air-chamber 13 is attached to the discharge-pipe for the purpose of steadying the flow of water. A steam-valve casing 14 is rigidly secured to the cylinder 1 by means of a steam-inlet pipe 15, leading from said casing to the upper end of said cylinder. The upper end of the cylinder 2 is connected to said casing by a steam-inlet pipe 16, which, as shown in Fig. 2, is in the form of a gooseneck to permit of a relative movement between the cylinder 2 and the steam-valve casing without straining the steam connections. Any suitable expansion-joint may be substituted for the one shown in Fig. 2. In Fig. 3 the steam-pipe 16$^a$, leading to the cylinder 2, is shown in the form of a complete loop.

Steam is admitted alternately to the cylinders 1 and 2 by means of a main steam-valve 17, arranged within the valve-casing, said valve being operated by steam-pistons 18, and steam is admitted to the outer ends of said pistons alternately by means of an auxiliary piston-valve 19, having heads 20 and 21, which alternately open and close the steam passageways 22 and 23, leading to the opposite ends of the main-valve pistons. Steam is conducted to the valve-casing through a steam-pipe 24 and is admitted to the cylinders 1 and 2 alternately, according to the position of the steam-valves. When the steam is admitted to one of the cylinders, the water therein is driven into the discharge-pipe through a check-valve 12, and when the steam is cut off from said cylinder the vacuum formed therein by the condensation of the steam draws water through the suction-pipe into the cylinder, filling the latter, and the admission of steam again to the cylinder forces this water into the discharge-pipe. The heating and cooling of the cylinder by the alternate admission of steam and water causes a longitudinal expansion and contraction of the cylinder which is utilized to operate the auxiliary valve 19.

In this invention the valves are arranged to admit steam alternately to the cylinders, so that while the water is being driven from one cylinder by steam-pressure the other cylinder will be filling with water on account of the vacuum caused by condensation of the previously-admitted steam, and one cylinder will therefore be expanding in length while the other is contracting. This relative movement of the cylinders is utilized to operate a system of multiplying levers which are connected with the auxiliary valve, so as to cause the latter to shift about the time that the water is discharged from either of the cylinders.

As shown in the drawings, the piston-rod 25 of the auxiliary valve is connected by a link 26 of the end of a bell-crank lever 27, the latter being pivotally mounted upon a support 28, attached to the cylinder 1. This bell-crank lever is connected by a link 29 to one end of a horizontally-arranged operating-lever 30. The opposite end of said lever extends through a pair of adjustable straps or collars 31 and 32, which are supported upon the cylinders 1 and 2, respectively. As shown, the strap or collar 31 is supported upon a thin metal blade 33, the upper edge of which fits into a groove in the lower side of the collar, while its lower edge fits into a groove in an arm 34, attached to the cylinder 1. The blades are secured within said grooves by suitable pins or rivets, as shown. Similarly a collar 32 is connected with the cylinder 2 by a blade 35. It will be seen that when the cylinder 1 is expanding by the heat of the steam while the cylinder 2 is being cooled and contracted by the water the lever 30 will fulcrum upon the blade 33, and as said blade moves upward while the blade 35 moves downward the combined movements of the cylinders will be transmitted to the operating-lever. When the cylinder 2 is expanding and the cylinder 1 contracting, lever 30 will fulcrum upon the blade 35 and the lever will be moved in the opposite direction. The blades 33 and 35 are made of comparatively thin spring metal in order that they may yield or bend slightly to accommodate the rocking motion of the lever 30. These blades afford a satisfactory and inexpensive connection between the operating-lever and the cylinders. The motion of the lever 30 is transmitted through the bell-crank lever and connections heretofore described to the auxiliary valve 19, and the position of said valve with relation to the steam-ports may be adjusted by an adjusting device 36 upon the two-part link or rod 26.

In Fig. 3 the parts are shown in the positions which they occupy when the cylinder 1 is commencing to discharge and the cylinder 2 is commencing to fill with water. Under this condition the cylinder 1 is contracted while the cylinder 2 is expanded, and the left-hand end of the lever 30 is therefore drawn downward, holding the auxiliary valve to the left, thereby admitting steam to the left-hand end of the main-valve piston. Steam therefore enters the cylinder 1 through the valve-casing and the pipe 15. The steam thus admitted to the cylinder 1 forces the water out of the latter and expands the cylinder, while the water which is drawn into the cylinder 2 by atmospheric pressure cools and contracts the latter, and the relative movement of the cylinders causes the left-hand end of the lever 30 to rise and shift the auxiliary valve to the right. This shifting of the auxiliary valve cuts off the steam from the left-hand end of the main-valve piston and admits steam through the port 23 to the right-hand end of the piston, thereby shifting the main valve to the left. Steam is thus cut off from the empty cylinder 1 and admitted to the cylinder 2, which is filled with water. The condensation of the steam in the cylinder 1 then causes water to flow into said cylinder by atmospheric pressure, and the water in the cylinder 2 is discharged by steam-pressure. By the time the water from the cylinder 2 is discharged said cylinder has become heated and the cylinder 1 has become cooled enough to cause a reverse movement of the auxiliary valve by reason of the expansion and contraction of the cylinders.

In order to facilitate the condensation of the steam within the cylinders, a spraying-nozzle 37 may be arranged within each cylinder, said nozzle being connected by a flexible pipe 38 to the main discharge-pipe 10. In order to permit the water to flow into said nozzle and to prevent the steam from escaping through the nozzle into the discharge-pipe, a suitable check-valve 39 is arranged in each pipe 38, which valve closes when steam is admitted to the cylinders.

In order to prevent excessive condensation of the steam while the water is being forced out and to prevent the water from entering the connecting-pipes 15 and 16 when the cylinders are filling, air-inlet valves 40 may be arranged at the upper ends of the cylinders, which will permit a small quantity of air to flow in when the steam condenses, and thus prevent the formation of complete vacuums, and this air serves as a non-conducting medium between the steam and water when steam is admitted to the cylinders.

It will be evident that by mounting the lever 30 so that it will be operated upon by the combined movement of both cylinders a much greater movement of the lever may be obtained than if acted upon by a single cylinder and that the flexible blades upon which said lever is alternately fulcrumed permit of the rocking movement of the lever without the necessity for a hinged or pivoted joint. The apparatus is so constructed as to operate automatically with a minimum number of parts.

Each cylinder may, if desired, have a separate suction-pipe, and the air-chamber may be dispensed with. When flexible steam or water connections are necessary, a hose may be used, if desired, and the operating-lever may be connected by suitable means to the main steam-valve instead of to the auxiliary valve, the latter in such case being rendered unnecessary.

Having thus fully described my invention, what I claim as new, and desire to secure by Letters Patent, is—

1. The combination with a pair of pump-cylinders having water inlet and discharge openings, and steam-inlet openings, of valve mechanism arranged to admit steam alternately to said cylinders, and connections between said mechanism and both cylinders whereby the combined movement of both cylinders, caused by expansion and contraction, will be transmitted to said mechanism.

2. The combination with a pair of pump-cylinders having water inlet and discharge openings and steam-inlet openings, of valve mechanism arranged to admit steam alternately to said cylinders, and means for operating said mechanism comprising an operating-lever connected to both cylinders, and connections between said lever and valve mechanism.

3. The combination with a pair of pump-cylinders having water inlet and discharge openings and steam-inlet openings, of valve mechanism arranged to admit steam alternately to said cylinders, and means for operating said mechanism comprising an operating-lever having one end connected at adjacent points to both cylinders and having its opposite end connected to said valve mechanism.

4. The combination with a pair of pump-cylinders having water inlet and discharge openings and steam-inlet openings, of valve mechanism arranged to admit steam alternately to said cylinders, and means for operating said mechanism comprising an operating-lever, laterally-yielding connections between one end of said lever and both cylinders, and connections between the opposite end of said lever and the valve mechanism.

5. The combination with a pair of pump-cylinders having water inlet and discharge openings and steam-inlet openings, of valve mechanism arranged to admit steam alternately to said cylinders, and means for operating said mechanism comprising an operating-lever, a pair of thin metal blades connecting one end of said lever with both cylinders, and connections between the opposite end of said lever and the valve mechanism.

6. The combination with a pair of pump-cylinders having water inlet and discharge openings and steam-inlet openings, of a valve-casing rigidly connected to one of said cylinders, a flexible steam connection between said casing and the other cylinder, valve mechanism within said casing adapted to admit steam alternately to said cylinders, and connections between said mechanism and both cylinders, whereby the combined movement of both cylinders, caused by expansion and contraction, will be transmitted to said valve mechanism.

In testimony whereof I affix my signature in presence of two witnesses.

FELIX FREYHOLD.

Witnesses:
J. A. WATSON,
C. W. CLEMENT.